United States Patent

[11] 3,565,240

| [72] | Inventor | Richard E. Nearman<br>Mount Airy, Md. |
|---|---|---|
| [21] | Appl. No. | 769,201 |
| [22] | Filed | Oct. 21, 1968 |
| [45] | Patented | Feb. 23, 1971 |
| [73] | Assignee | Eaton Yale & Towne Inc.<br>Cleveland, Ohio |

[54] CONVEYOR CARRIER APPARATUS
15 Claims, 4 Drawing Figs.

[52] U.S. Cl.................................................. 198/177,
105/154, 248/317, 285/402
[51] Int. Cl...................................................... B61b 3/00,
B65g 17/20, F04g 17/18
[50] Field of Search............................................ 198/177,
131; 104/94, 95, (Inquired); 105/154, 155;
287/20, 924, 23 (Inquired), 103 (A), (Inquired);
285/401—402, (Inquired); 248/317

[56] References Cited
UNITED STATES PATENTS
2,047,714  7/1936  Smith............................ 285/402X
2,471,347  5/1949  Rayburn....................... 198/177

FOREIGN PATENTS
383,265  12/1964  Switzerland................. 198/177
892,539  3/1962  Great Britain................ 198/177

*Primary Examiner*—Edward A. Sroka
*Attorney*—Littlepage, Quaintance, Wray & Aisenberg ABSTRACT: Carrier apparatus having vertical shafts with horizontal pins extending through the shafts and having carrier devices with central collars for surrounding portions of the shaft and horizontal extensions extending outwardly from the collar with vertical extensions near remote ends for receiving spools are described herein. Collars of carrier devices are rectangular and have stops welded within two diagonally opposite angles so that the stops rest against the pin means when they are aligned and so that the device may be moved over the shaft past the pin means when the device is lifted and turned 90° to align the other diagonal angles of the collar with pin means.

PATENTED FEB 23 1971
3,565,240
SHEET 1 OF 2
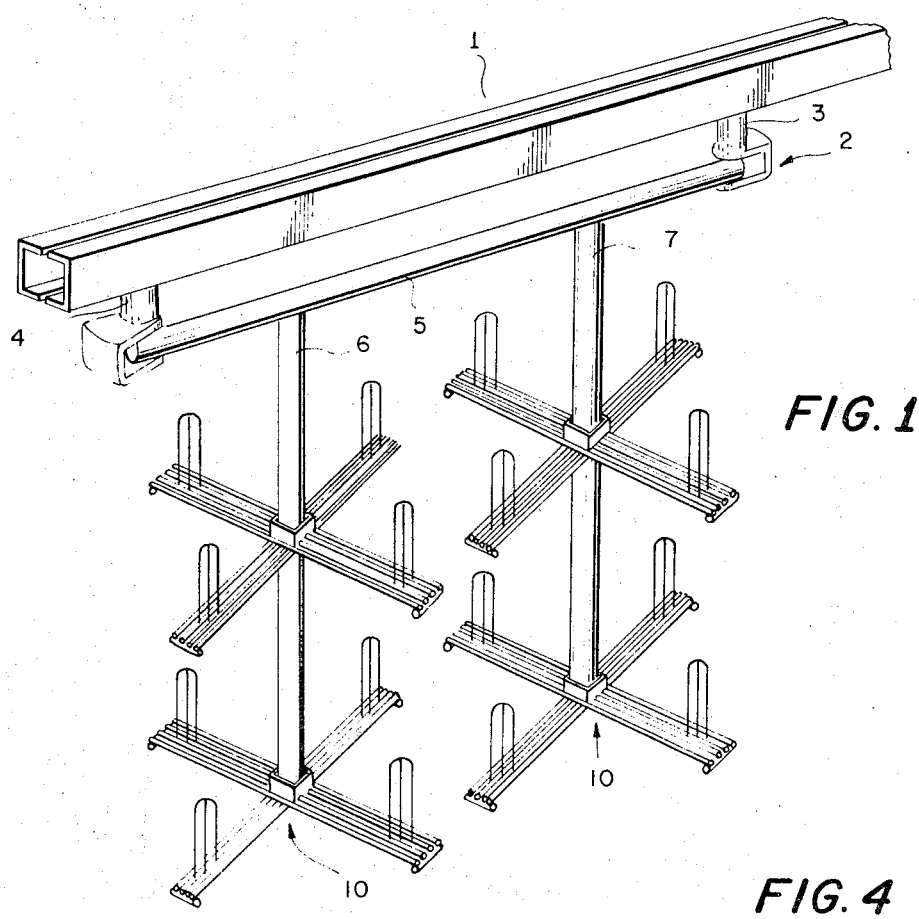
FIG. 1
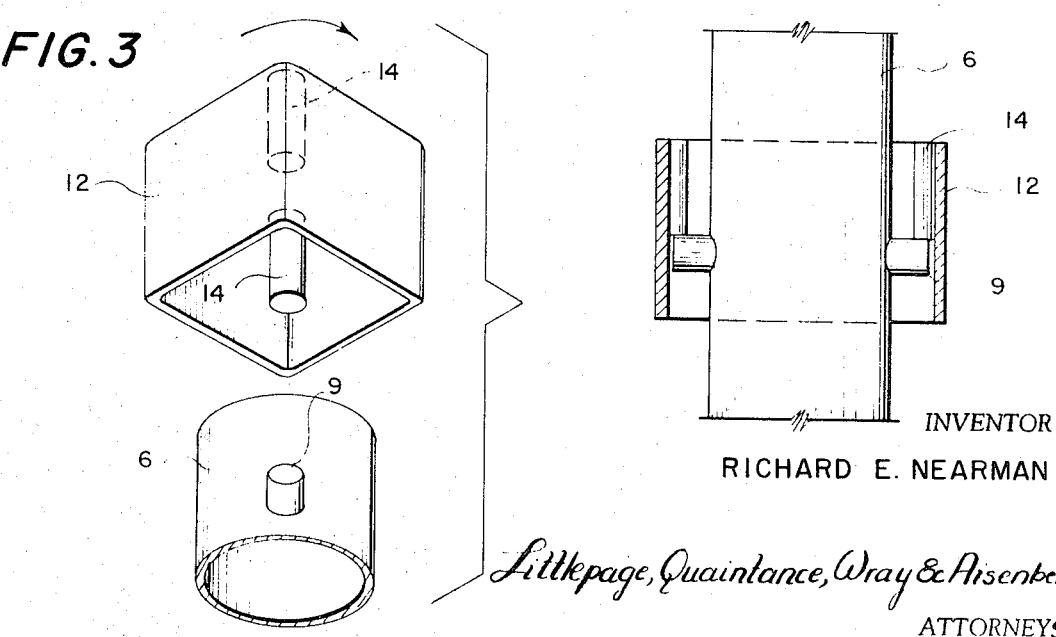
FIG. 3
FIG. 4
INVENTOR
RICHARD E. NEARMAN
*Littlepage, Quaintance, Wray & Aisenberg*
ATTORNEYS

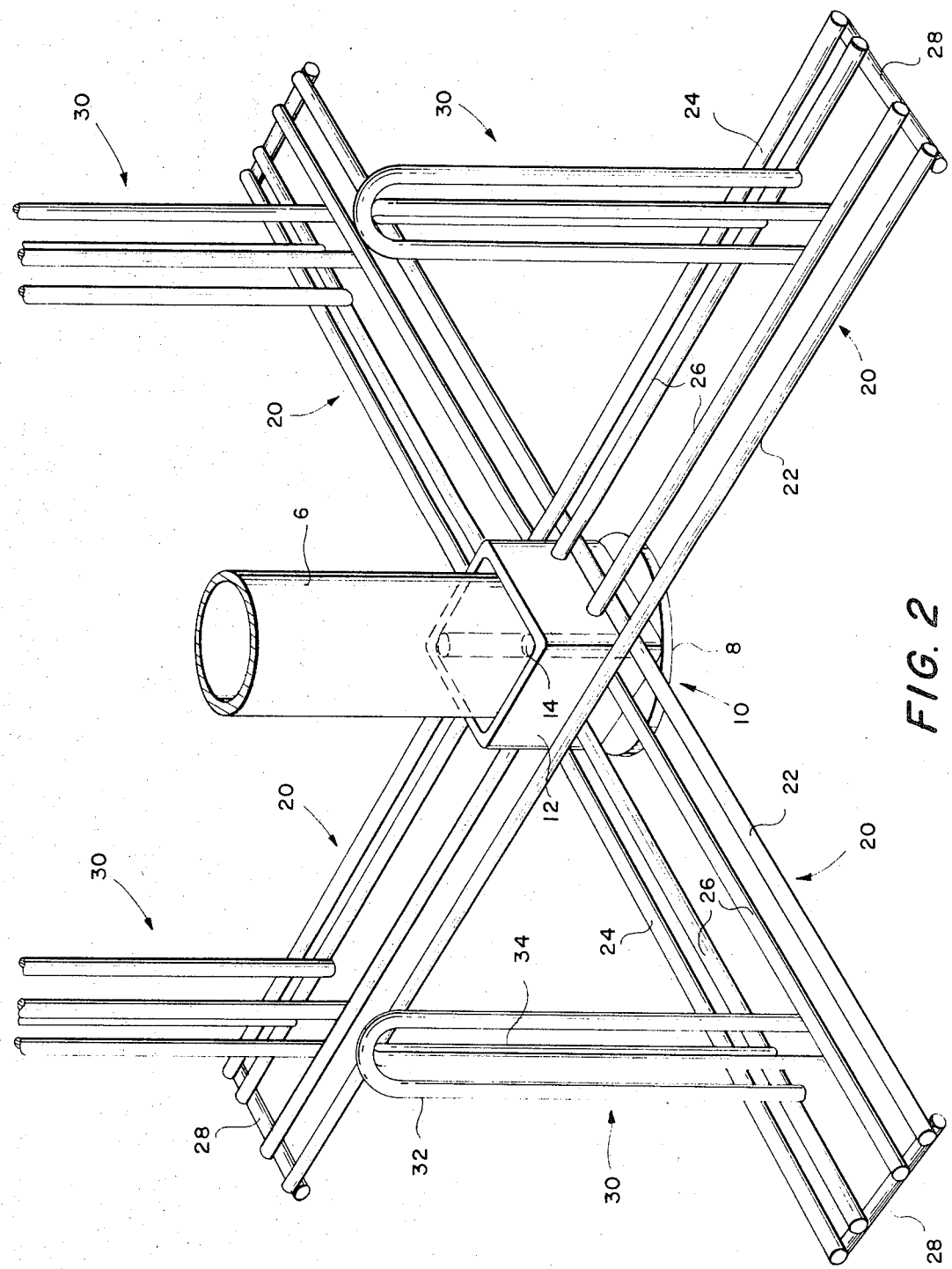

CONVEYOR CARRIER APPARATUS

BACKGROUND OF THE INVENTION

As labor costs increase, demands for improved material handling systems and devices increase. It is particularly important to provide conveyor apparatus which can be used to transport a high concentration of materials. The same conveyor system should be useful to transfer light loads from place to place in the factory; consequently, it is extremely important to have carriers with flexible loading capacities.

Materials carried by conveyors should be readily accessible so that they may freely and conveniently be added to and taken from the conveyors. It is important that the goods on a conveyor be mounted on a level which is readily accessible and which is convenient to use in operation. It is also important that as much as possible of the volume which a conveyor system occupies by available for the conveying of materials.

Problems of conveying materials with flexibility and convenience are increased when the materials comprise several independent units. This is especially true when the units must be able to be reached selectively and separately for unloading and loading, and when using materials while the units are mounted on the carrier.

SUMMARY OF THE INVENTION

The present invention generally concerns conveyor carrier apparatus and primarily concerns carrier apparatus which is movable along vertical carrier shafts to hold and selectively position individual units on a carrier for conveying from station to station. In a preferred embodiment of the invention carrier devices are configured to hold spools for conveying.

Although the carrier apparatus of the invention has utility when applied to any conveyor system, it has particular utility when applied to a power and free conveyor system, and the carrier further has particular utility when employed with the trolley and hanger apparatus described in copending application Ser. No. 728,513, filed May 13, 1968, and entitled "Trolley and Hanger Apparatus." For convenience the trolley and hanger apparatus or any other mounting with which the present carrier is used generally is referred to as a conveyor.

The present invention has a vertical shaft which is attached at its top to a conveyor. The shaft is conveniently made of a steel or an alloy tube having an outside diameter in a preferred embodiment of about 1½ inches and having a length of about 3½ feet. The top of the tube is configured for attaching to a conveyor, and the bottom has a transverse stop for holding carrier devices.

Carrier devices are constructed with central collars which fit over the tube and which rest against the stop. Horizontal elements for receiving the goods to be carried extend outward from the collars. In a particular application of carrier devices which involves carrying spools of wound goods from place to place in a mill, the horizontal surfaces have upward projections near outward extremities from the collar to receive the spools. The collar in one embodiment has an internal dimension slightly larger than 1½ inches. Horizontal surfaces may extend for about 7 inches from the collar, with 5½ inches vertical elements mounted about 2 inches inward from the outer limits of the horizontal surfaces.

So that the carrier devices may be mounted at selected points along the lengths of carrier shafts, auxiliary stops are mounted at selected positions along the shafts. In a preferred embodiment, the auxiliary stops comprise pins about 2 inches long, which project about ¼ inch from opposite points of the pipe, and which are firmly anchored within the pipe by welding or other convenient means. The collars and auxiliary stops are configured to cooperate so that the collars may be passed over the stops or may be rested upon the stops as desired.

In the preferred embodiment in which pins are mounted in the vertical pipe, the collars have a rectangular form with a square cross section, square walls and open upper and lower ends. The transverse dimension of the square are slightly greater than 1½ inches, so that the square collar fits conveniently about the pipe, and the diagonal dimension of the square is slightly greater than 2 inches.

In two diagonally opposed corners or inside angles of the square collar, small obstructing elements are mounted to prevent the passage of a pin through the collar when the pin is oriented in the direction of the obstructing elements. The obstructions begin at a point about ⅜ inch up from the bottom of the collar so that the pin may be firmly engaged beneath the obstructions to support the carrier device on the pin. That relationship is held throughout the movement of the conveyor, until it is desired to move the carrier device upward or downward on the pipe. The other interior angles of the square collar have no obstructions so that when the carrier device is lifted from the pin means and is turned 90°, the device may be moved freely upward and downward along the pipe.

In a preferred embodiment each carrier device has two perpendicularly oriented horizontal members. Horizontal surfaces are constructed of four parallel three-sixteenth inch rods. Two outer rods run along opposite sides of a collar and are welded thereto. Two inner rods abut the collar and are welded to the outer rods of second horizontal surface elements which are perpendicular to the first elements. In a like manner inward ends or inner rods of second horizontal elements are welded to outer rods of the first elements. Remote ends of the rods are welded to transverse pieces.

The vertical elements are constructed of two three-sixteenth inch rods having a medial 180° bend. One rod perpendicularly crosses over the other rod at the bend, and the ends of the rods are welded the the central rods of the horizontal surface.

Three-sixteenths inch rods are welded as obstructions in the inside corners of the square collars, and the rods extend from the top of the collars to about ⅜ inch from the bottom of the collars.

In one form of the invention, a first stop is fixed to the bottom of one of the vertical pipes, and an auxiliary stop is mounted at about the middle of the pipe. The carrier devices may be positioned on the stops when they are loaded and unloaded. Alternatively, the upper devices may be lowered to the bottom of the pipe and loaded then pushed up and turned 90° to mount the device in its upper position. The bottom stop and the medial stop may be pins; alternatively, the bottom stop may be a horizontal flange.

When transporting empty carrier devices several of the devices may be nested in angularly disposed relationship on a single pipe. The angular nesting arrangement is useful when loading or unloading upper carrier devices.

Spools are loaded on the carrier devices, which provide maximum use of available space. The individual elements are accessible throughout the operation of the carrier apparatus, and loading and unloading of the carrier devices may be accomplished at a uniform level.

It is the objective of this invention to provide conveyor carrier apparatus having shafts extending downward from a conveyor and having mounted on the shafts carrier devices with horizontal surfaces and vertical extensions.

This invention has an another objective the provision of carriers with vertical shafts and carrier devices having horizontal surfaces mounted at selective positions along the carrier shafts.

Another objective of the invention is the provision of improved carrier apparatus having shafts and with stops extending outward from the shafts and having carrier devices which my be engaged with and which may be disengaged from the stops along the shafts and which may be freely moved past the stops on the shafts.

A further objective of this invention is the provision of spool holding carrier devices which have central collars for mounting on vertical carrier shafts, with internal obstructions in the collars to selectively prevent the carrier devices from moving along the shafts over the stops on the shafts and to permit the motion of the carrier devices over the stops.

Further objectives of the invention will be apparent from the specification and the drawings.

BRIEF DESCRIPTION OF THE DRAWINGS

FIG. 1 is a perspective view of carrier apparatus of the present invention mounted on a free trolley of a conveyor.

FIG. 2 is a detail of a carrier device mounted on a carrier shaft.

FIG. 3 is a detail of the collar with internal obstructions and a shaft and a stop.

FIG. 4 is a sectional detail of a collar nesting on a stop.

DETAILED DESCRIPTION OF THE DRAWINGS

Referring to FIG. 1 a conveyor track is generally indicated by the numeral 1. Trolley apparatus is generally indicated by the numeral 2. In this case the trolley apparatus 2 comprises a free trolley of a power-and-free conveyor system. First and second trolley hangers 3 and 4 are interconnected by hanger bar 5 which is pivoted to the trolley hangers at opposite ends thereof. Shaft means 6 and 7 are suspended from hanger bar 5 so that they move along with trolley apparatus 2 directly beneath track 1. Each carrier shaft 6 and 7 has two carrier devices 10 mounted thereon.

As shown in FIG. 2 each carrier device comprises a square collar 12 having open upper and lower ends. The transverse side to side dimension of the square is slightly larger than the external diameter of shaft 6. Shaft 6 has at its lower end a horizontal flange 8 which prevents downward movement of carrier device 10. Alternatively, movement of carrier device 10 off of the lower end of shaft 6 may be prevented by a pin transversely mounted in the shaft. Each carrier device 12 has vertical rods 14 mounted in two diagonal corners to cooperate with a pin mounted in shaft 6 to selectively hold or release the carrier devices 10. Each of the carrier devices has load carrying devices which extend outward from collar 12. The load carrying means of carrier device 10 are opposed horizontal shelves 20. Outer parallel rods 22 and 24 are medially welded to opposite sides of the square collar. Intermediate parallel rods 26 are outwardly coextensive with the outer parallel rods and are welded to end rods 28 and to the outer rods of horizontal extensions which are perpendicular to the first and second horizontal projections. Each horizontal shelf 20 supports a vertical spool holding extension 30. Vertical extensions 30 are made of pairs of rods 32 and 34 which are medially bent at 180°. The rods are welded together at the medial bent portions, and the free ends of the rods are welded to intermediate parallel rods 26 of the horizontal shelves.

FIG. 3 is a detail of the pin stop means 9 on a shaft 6 and the cooperating internal rods 14 on collar 12. As shown in FIG. 4 pin 9 projects a short distance from opposite sides of shaft 6. Internal rods 14 have downward ends spaced from the lower surface of collar 12 so that the pin 9 is firmly held within the collar to hold the carrier device 10 on the shaft to prevent its unintentional movement along the shaft. When it is desired to move the carrier device 10 along shaft 6, the device is raised so that pin 9 is moved out of the collar 12. Collar 12 is turned such as shown by the arrow in FIG. 3 so that the open internal angles of the collar are aligned with pin 9, and in this position the collar may be freely passed over pin 9. Thus, the collar and carrier device are firmly held in place when transporting loads on the conveyor. When it is desired to move the carrier axially along shafts 6 and 7, a simple lifting and twisting motion permits the sliding of the carrier devices along the shafts. Such sliding may be important when loading or unloading the upper carrier devices or when nesting a group of carrier devices on a single shaft for moving them along the conveyor. If it is desired to detach the carrier devices from the shafts so that the devices may be held at work stations while operations are performed or so that the devices may be loaded or unloaded while the carrier shafts continue in motion, the bottom stop of the shafts is a simple pin 9. The carrier devices 10 then may be conveniently added or removed to or from the bottom of the shaft. As shown in FIG. 1, it is convenient to orient the pins 9 perpendicularly with respect to the travel of the conveyor so that the horizontal surfaces 20 of the carrier devices 10 will be aligned at 45° angles to the carrier axis.

From the foregoing description, it will be obvious to those skilled in the art that modifications and variations of the present invention may be constructed. The scope of the invention is not limited to the example described herein; rather the scope is defined only in the following claims.

I claim:

1. Conveyor carrier apparatus comprising conveyor means and shaft means depending from the conveyor means, stop means mounted on the shaft means, a collar having internal projections cooperating with the stop means to engage the stop means and internal recesses to disengage the collar from the stop means and to permit the collar to bypass the stop means, and load carrying extensions extending outward from the collar.

2. The conveyor apparatus of claim 1 wherein the extensions comprise opposed horizontal extensions extending outwardly from the collar and vertical extensions mounted on the horizontal extensions and extending upward therefrom adjacent outward limits of the horizontal extensions.

3. The carrier apparatus of claim 1 wherein the opposed horizontal extensions comprise first and second extensions on opposite side of the collar and second and third extensions on opposite sides of the collar in a direction angularly related to a direction of the first and second horizontal extensions.

4. The carrier apparatus of claim 3 wherein the second and third horizontal extensions lie in a direction perpendicular to the direction of the first and second horizontal extensions.

5. Conveyor carrier apparatus comprising conveyor means and shaft means depending from the conveyor means, pin means extending horizontally through the shaft means, and a collar comprising a rectangular box open at upper and lower ends the collar having load carrying extensions extending outward from the collar, and the color having means cooperating with the pin means to engage and to disengage the collar from the pin means and the collar having at least one transverse internal dimension between opposite sides of the box which is slightly larger than a maximum transverse dimension of the shaft means, wherein the pin means has a dimension greater than the transverse dimension of the rectangular collar and smaller than a diagonal dimension of the collar whereby the collar and the carrier device may be moved along the shaft past the pin means when a diagonal direction of the collar is oriented parallel to the pin means.

6. The conveyor apparatus of claim 5 wherein the carrier device has a detent means located upward from a bottom portion of the device for receiving the pin means, whereby raising the carrier device and turning the carrier device with respect to the shaft means and to the pin means and aligning the diagonal direction of the collar with the pin means permits passing the carrier device by the pin means.

7. The apparatus of claim 6 wherein the detent means is in the collar.

8. The apparatus of claim 7 wherein the detent means comprises obstructions in opposite angles of the collar, which obstructions are spaced upwardly from the bottom of the collar, whereby turning the collar and the aligning one diagonal dimension thereof with the pin means and bringing the collar into contact with the pin means will bring the obstructions into contact with the pin means, whereby the collar and carrier device rest upon the pin means, and whereby lifting the collar and turning it with respect to the shaft means and aligning the other diagonal dimension parallel to the pin means will allow the collar and carrier device to pass over the pin means along the shaft.

9. A carrier device for a conveyor system comprising a collar, load carrying extensions extending outward from the collar, stop receiving means in the collar for receiving stops and holding the device with respect to a conveyor means, the collar further comprising stop bypassing means having elongated internal recesses within the collar and oriented angularly with respect to the stop receiving means, whereby the collar may pass over stops within the recesses.

10. The carrier device for a conveyor system comprising a collar having a continuous body having open upper and lower ends load carrying extensions extending outward from the body, stop receiving means positioned in the body upward from the lower end for receiving stops and holding the device with respect to a conveyor means, the collar further comprising stop bypassing means having elongated internal recesses within the collar and oriented angularly with respect to the stop receiving means.

11. A carrier device for a conveyor system comprising a collar having a continuous body having open upper and lower ends, load carrying extensions extending outward from the collar, stop receiving means in the collar for receiving stops and holding the device with respect to a conveyor means, the collar further having angular lateral projections, wherein at least one of the angular projections comprises a stop bypassing means oriented angularly with respect to the stop receiving means.

12. The carrier device of claim 11 wherein the collar has a rectangular cross section, wherein stop receiving means are mounted in first and second opposite internal angles of the rectangular collar, and wherein third and fourth opposite internal angles of the collar comprise stop bypassing means.

13. The carrier device of claim 12 wherein the collar defines a square cross section.

14. The carrier device of claim 11 comprising a collar having a square cross section with open upper and lower ends, first and second horizontal projections extending outward from first and second opposite sides of the square collar, third and fourth horizontal projections projecting outward from third and fourth sides of the collar, successive projections being at right angles with respect to each other, and vertical upward extensions mounted on the horizontal projections adjacent outward thereof.

15. The carrier device of claim 14 wherein the first and second horizontal projections comprise first and second parallel rods medially connected to third and fourth sides of the square collar and intermediate parallel rods extending from the first side and from the second side of the square collar and being outwardly coextensive with the first and second parallel rods, and wherein the vertical extensions comprise first and second parallel rods having a 180° bends and being connected at opposite ends to the intermediate rods.